United States Patent Office 3,520,119
Patented July 14, 1970

3,520,119
COTTON PICKER
Robert S. Brace, Edward L. Robinson, Jr., and Paul J. Hulseberg, Memphis, Tenn., assignors to International Harvester Company, Chicago, Ill., a corporation of Delaware
Filed May 21, 1968, Ser. No. 730,827
Int. Cl. A01d 45/18
U.S. Cl. 56—14                    10 Claims

ABSTRACT OF THE DISCLOSURE

A cotton picker having a traction wheel driven ground traversing structure supporting a picker with rotors therein, a receptacle for harvested cotton and a conduit with constant speed fan means for conveying the cotton from the picker to the basket, and a power train from an engine to an input shaft of a transmission providing variable speed drive between the engine and the transmission driving the traction wheels and a drive from the input shaft of the transmission to the cotton picker rotors so that the speed of the rotors and the ground drive speed is synchronized independent of the fan speed.

FIELD OF THE INVENTION

This invention is directed to cotton pickers and more specifically to cotton pickers with improved combination of operating components and drives therefor for purposes of propelling the machine in the field for operating the harvesting mechanism and providing an adequate conveyance of the harvested material and such as will synchronize the forward traverse of the cotton picker with the picker rotor peripheral speed without affecting the conveyance of the harvested material.

DISCUSSION OF THE PRIOR ART

In the prior art the transmission was arranged to provide a drive from the output shaft of the ground drive transmission to the drum's cotton picker rotors and the fan drive has been usually taken off from this shaft. Clutching of the drive to the ground wheels affected the rotor drive and/or the fan drive. It has been found that for trouble plug-free operation it is necessary to provide a constant speed fan drive independent of the drives to the picker components or to the ground traversing means so that if necessity should arise power can be directed solely to the fans and/or to the picker drums to clear them without the necessity of engaging the ground drive. The necessity for maintaining the good flow of material through the pneumatic conveyor system is dictated by the nature of the crop in that it is expedient for efficient operation to move the cotton in continuous small increments as a continuous flow instead of resurgent nonuniform bunches in order to prevent or minimize the cracking of seeds against the fan blades such as will cause the downgrading of the cotton and staining of the cotton as well as loss of seed.

SUMMARY OF THE INVENTION

It is a general object of the invention to provide a novel cotton picker in which drives to the various components of the picker including the picker rotor, the ground traversing drive and the fans is so correlated as to optimize operation of the three functions in a single coherent unit.

More specifically, an object of the invention is to provide a novel drive for a cotton picker in which the prime power source provides a direct drive to the fans and wherein the input shaft drive to the transmission is releasably coupled with the drive means to the cotton picker rotors. Thus, rotors may be actuated or operated independently of the ground traverse. In this type of an arrangement there is no loss of torque by having the power to go through transmission and the ground drive prior to being delivered to the other driven components, namely, the rotor of the cotton picker and the fans. In the present arrangement reserve power is always at the command of the operator which heretofore would be expended in moving the vehicle through the field.

These and other objects of the invention become more readily apparent from the specification and the drawings wherein.

Figure 1:
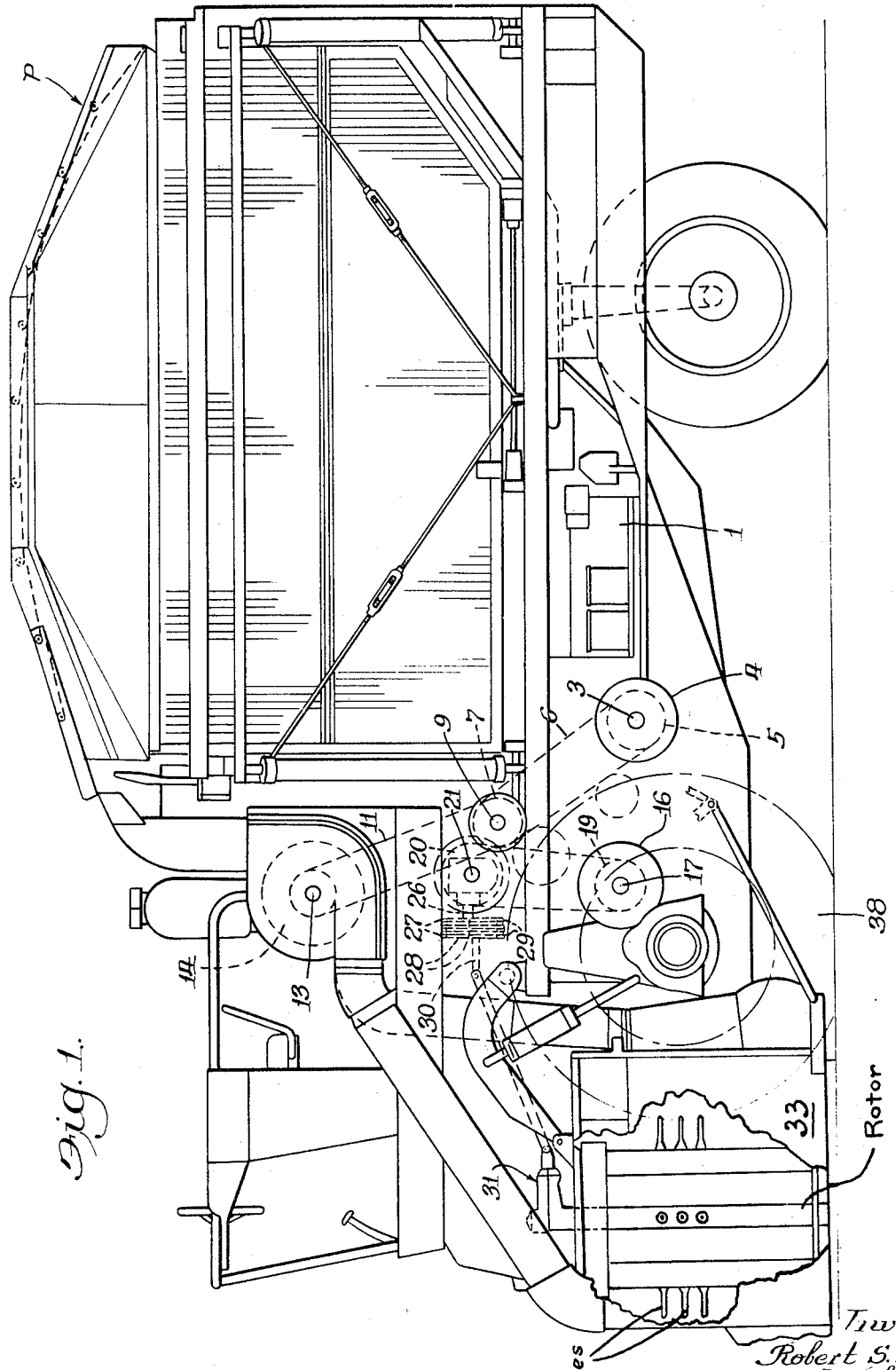
FIG. 1 is a side elevational view of the cotton picker embodying the novel drive arrangement.
Figure 2:
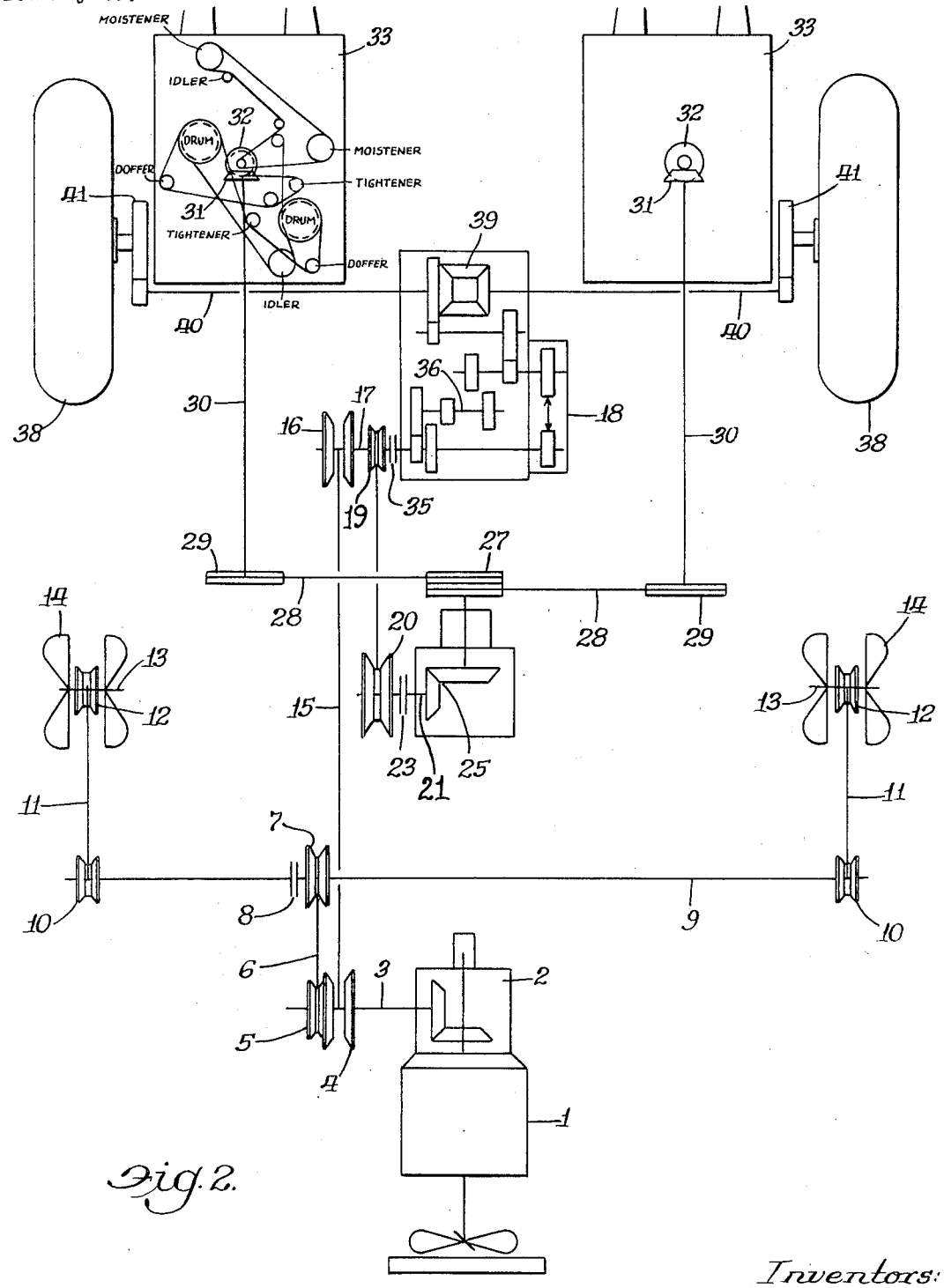
FIG. 2 is a diagrammatic view of the invention showing the drive illustrated in FIG. 1.

In the embodiment of the invention disclosed in FIGS. 1 and 2 the cotton picker P comprises an engine 1 having a power take-off gear case 2 with an output shaft 3 connected to a variable speed ground drive pulley 4 and a fixed pulley 5. The fixed pulley 5 drives a belt 6 which is trained about a fixed pulley 7 which is connected by a clutch 8 to a countershaft 9 which in turn drives pulleys 10 and thus belts 11 which in turn drive pulleys 12 connected to shafts 13 of fans 14.

The pulleys 5 through 13 constitute a first drive train which connects the output shaft 3 of the engine 1 to the fan means 14 to provide a constant drive therefor.

The variable speed pulley 4 is drivingly connected by belt 15 to a variable speed pulley 16 which is mounted on and connected to an input shaft means 17 of the ground drive transmission 18. The input shaft 17 is connected to a pulley 19 which in turn is belt-connected to pulley 20 mounted on the high speed transfer shaft 21 and connected thereto via a clutch 23. Shaft 21 is connected by means of a gear assembly 25 to a low speed high torque output shaft 26 which drives a double pulley assembly 27 and power transfer belts 28, 28 and pulleys 29, 29 which in turn drive the shafts 30, 30 which are connected to the gear transfer means 31, 31 of the input shafts 32, 32 of the drums and driving the rotor 33a, 33a and other components of the pickers 33, 33.

The input shaft means 17 is connected via clutch 35 to a sliding gear train 36 which provides forward and transport speed and a reverse drive to the ground drive means 38, 38, which are in the present structure wheels 38 of the tractor, said transmission 36 driving through a differential 39 via the shafts 40, 40 and drop axle gearings 41, 41, to the respecitve wheels 38, 38.

Figure 3:
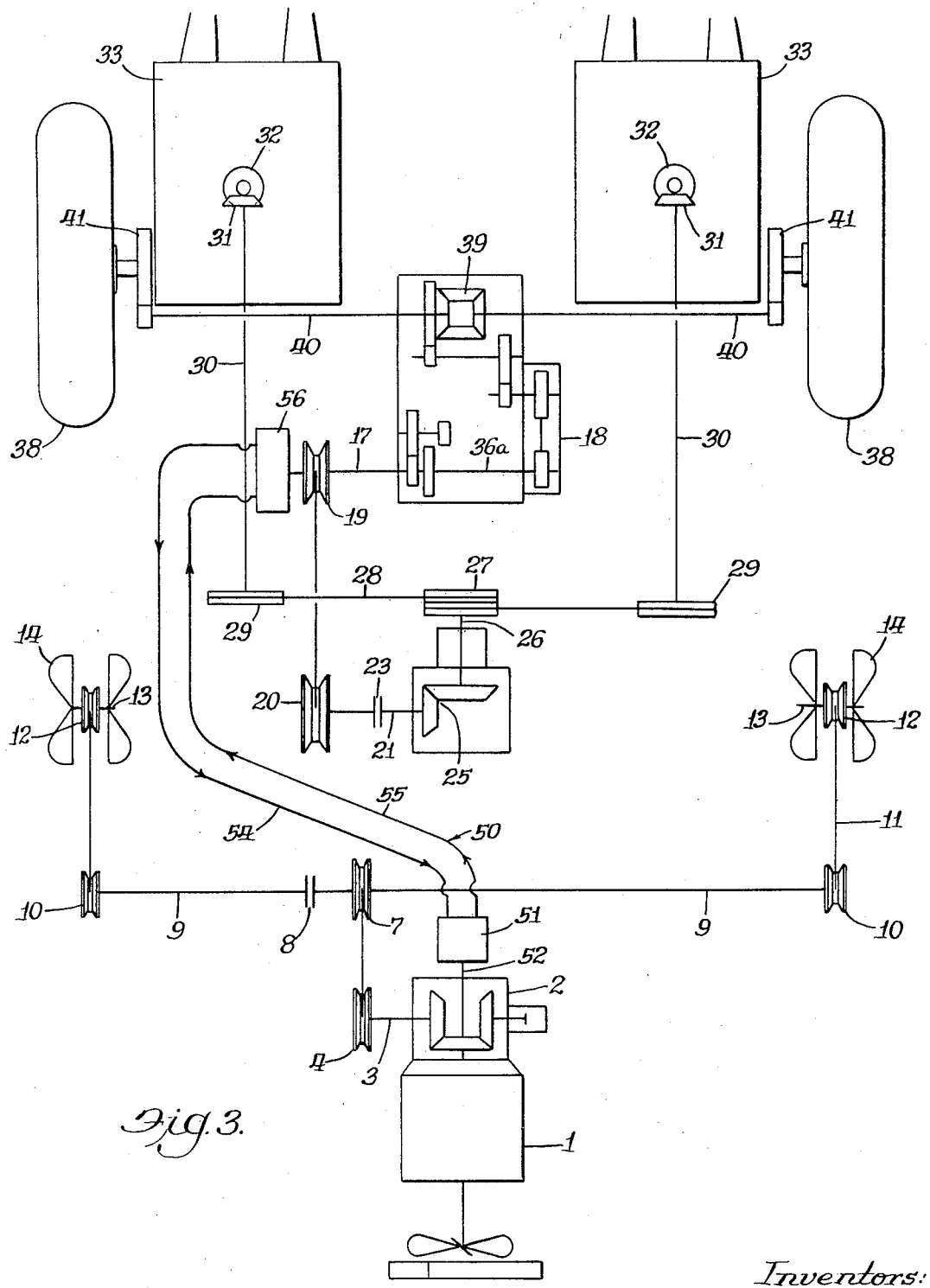
FIG. 3 is a diagrammatic illustration of further embodiment incorporating a hydrostatic drive.

Referring now to the embodiments of the invention shown in FIG. 3 it will be seen that the entire drive assembly is identical with that previously described with the exception that in lieu of the mechanical drive train between the engine output shaft 3 and the transmission 36 there is provided hydrostatic drive mechanism generally designated 50 including a pump 51 driven from the output shaft 52 of the engine 1, pump 51 being connected by hydraulic lines 54, 55 to the hydraulic motor 56 which is connected to the input shaft 17 of the transmission. The transmission in the present instance is identified at 36a and is modified over the structure shown at 36 in the previous embodiment in that it has a different gear component in view of the fact that the hydrostatic transmission 50 provides a variable output and therefore the gear ratios required in the mechanical transmission are obviated. Otherwise the transmission of power with respect to its ground drive means 38 is substantially the same as in the previous embodiment and where applicable the same reference numerals are used. It will be noted that in this instance the drive to the fans is direct from the engine 1 and that the drive to the rotors 33a is correlated by having the drive proceed from the input shaft of the transmission to the respective rotors.

Having described several preferred embodiments of the invention, various other forms which are intended to be covered will become readily apparent within the scope of the appended claims.

What is claimed is:
1. In a cotton picker of the type having:
   (a) ground traversing means,
   (b) picker means including a rotor having a plurality of rotatable spindles and drive means for rotating the spindles and orbiting the rotor at a peripheral speed approximately equal to the forward travel of the harvester,
   (c) means for conveying cotton harvested by the spindles into an associated container comprising a duct and associated fan means for delivering into a receptacle cotton picked by the picker means, the improvement comprising:
   a power source having an output shaft,
   a first drive train connecting said output shaft with said fan means and providing a substantially constant speed drive for the fan means independent of the speed of ground traversing means and the picker means,
   a transmission having forward and reverse speeds and including input shaft means, said transmission comprising an output shaft member operatively connected to said ground traversing means,
   a second drive train connecting said output shaft of the power source with the input shaft means of said transmission, a third drive train connecting said input shaft means with said rotor drive means for driving the same independently of said ground traversing means and said fan means, and means for connecting and disconnecting each drive train independently of the other.

2. The invention according to claim 1 and said second drive means including means for varying speed ratios only between said output shaft to said input shaft means whereby the rotor speed and ground drive means speed are correlated.

3. The invention according to claim 1 and said transmission comprising selective gear settings positionable in a first setting to provide an operating speed, a second setting to provide transport speed and a third setting providing a reverse.

4. The invention according to claim 1 wherein said first drive train includes variable speed means for varying the speed between said output shaft and said input shaft means whereby varying the speed therebetween.

5. The invention according to claim 1 and clutch means between said input shaft element and said transmission for disconnecting the ground drive means independently of the rotor drive train and the fan drive train.

6. The invention according to claim 1 and a clutch in the third drive train for the rotor for connecting and disconnecting drive thereto independently of the ground drive and the fan drive.

7. The invention according to claim 1 and clutch means in the first drive train for connecting and disconnecting the fan means independently of the ground drive and the rotor drive.

8. The invention according to claim 1 and said second drive train including a variable drive between the output shaft and the input shaft means for concurrently varying the drive through said transmission to the ground drive means and proportionately varying the drive to said rotor, and clutch means for connecting and disconnecting said drive means between the rotor and the input shaft means.

9. The invention according to claim 1 wherein said second drive train comprises a hydrostatic transmission.

10. The invention according to claim 9 and said hydrostatic transmission comprising a pump connected to the output shaft, a motor connected to the input shaft means and conduits interconnecting the pump and motor.

References Cited
UNITED STATES PATENTS

| | | | |
|---|---|---|---|
| 1,802,021 | 4/1931 | Johnston et al. | 56—16 |
| 2,719,394 | 10/1955 | Thomann et al. | 56—14 |

ROBERT PESHOCK, Primary Examiner